April 19, 1927.
C. O. MAST
ROD COUPLING
Filed May 12, 1926
1,625,266
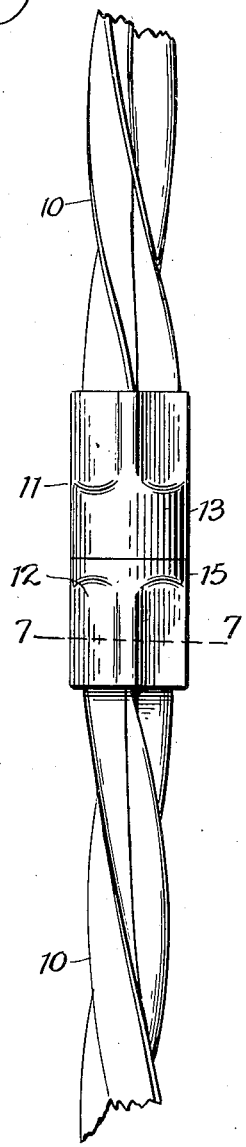
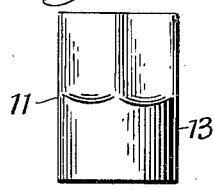
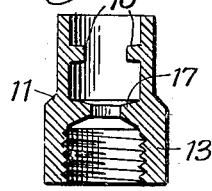
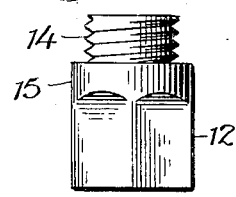
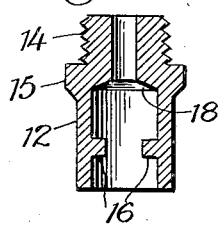
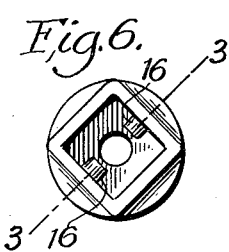
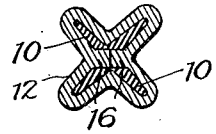
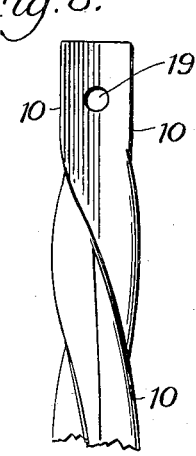
Inventor
Charles O. Mast
By E. T. & J. F. Brandenburg
Attorneys Patented Apr. 19, 1927.

1,625,266

UNITED STATES PATENT OFFICE.

CHARLES O. MAST, OF COVINGTON, OHIO, ASSIGNOR TO MAST LIGHTNING ROD COMPANY, OF WEST MILTON, OHIO.

ROD COUPLING.

Application filed May 12, 1926. Serial No. 108,586.

The present invention relates to sectional rods, and particularly to a coupling for joining adjacent sections of a lightning rod.

For convenience in handling and shipping, lightning rods are usually made in sections and coupling members are affixed to the ends of the sections, so that the latter may be readily joined at the place where the rod is erected.

The general object of the invention is to provide a coupling for this purpose that is of very simple and strong construction and can be positively affixed and locked to a lightning rod section by a simple operation. The particular nature and advantages of the invention will become apparent hereinafter.

Referring to the accompanying drawings, which illustrate one practical form of the invention:

Fig. 1 shows, in elevation, end portions of two lightning rod sections joined by a coupling embodying the invention;

Figs. 2 and 3 are, respectively, a side-elevation and a longitudinal-section of one coupling member before it is affixed to the rod;

Figs. 4 and 5 are similar views of the other coupling member;

Fig. 6 is an outer end view of either coupling member;

Fig. 7 is a cross-section on line 7—7 of Fig. 1; and

Fig. 8 shows an end portion of a rod section, adapted to receive a coupling member.

The coupling is shown applied to a solid lightning rod formed with four ribs, or fins, 10 extending spirally about the axis of the rod, except at the end portions which are to receive the coupling members, where the fins extend parallel to the axis, as clearly shown in Fig. 8.

The coupling comprises two members 11 and 12 of suitable metal, such as copper. These members are cast in the form indicated by the drawings. Member 11 comprises a cylindrical part 13, which is interiorly threaded to receive an exteriorly threaded reduced end 14 of member 12; and member 12 has a cylindrical part 15 of the same diameter as that of the cylindrical part 13 of member 11, so that when the two members are screwed together, as shown in Fig. 1, their abutting ends merge and present a substantially continuous cylindrical periphery. The outer, or non-adjacent, ends of the two coupling members are square in cross-section, as shown in Fig. 6; and diametrically opposed projections or rivets 16 are formed on the inner walls of these square portions. The coupling members are further formed with interior shoulders 17 and 18 at the inner ends of the square portions.

A coupling member of the above-described construction is applied to a rod section in the following manner: The square end of the coupling member is placed over the end of the rod with the parallel fins of the latter loosely in the corners of the former, considerable clearance being provided. The angular position of the coupling member with respect to the rod is such that, when the end of the rod abuts the shoulder 17 or 18, the projections or rivets 16 will be in alignment with a transverse aperture 19 through the body of the rod. With the parts so positioned, the walls of the coupling member are collapsed and crimped tightly about the fins, as represented in Fig. 7, the opposed projections 16 entering the aperture 19 and thereby effecting a very secure locking of the coupling member to the rod.

Changes may be made in the specific construction shown and described without departing from the invention as defined in the claim.

What I claim to be new and desire to secure by Letters Patent is:

A sectional lightning rod comprising two sections each formed of a solid bar, having a plurality of fins extending spirally about the axis thereof except at the adjacent end portions, where the fins extend parallel to the axis, a coupling between said end-portions comprising two members threaded together at one end and crimped tightly about said parallel fins at their opposite ends, the said portions each having an aperture extending transversely through the body thereof, and each coupling member, at the crimped end, having integral, oppositely disposed, rivet projections, dimensioned to occupy and to extend in abutting relation in the respective aperture.

In testimony whereof I hereunto affix my signature.

CHARLES O. MAST.